US008808085B2

(12) United States Patent
Schugar

(10) Patent No.: US 8,808,085 B2
(45) Date of Patent: Aug. 19, 2014

(54) WAGERING GAME THAT ALLOWS PLAYER TO ALTER PAYOUTS BASED ON EQUITY POSITION

(71) Applicant: David Schugar, Henderson, NV (US)

(72) Inventor: David Schugar, Henderson, NV (US)

( * ) Notice: Subject to any disclaimer, the term of this patent is extended or adjusted under 35 U.S.C. 154(b) by 0 days.

(21) Appl. No.: 13/685,651

(22) Filed: Nov. 26, 2012

(65) Prior Publication Data

US 2013/0178278 A1 Jul. 11, 2013

Related U.S. Application Data

(63) Continuation of application No. 12/099,778, filed on Apr. 8, 2008, now Pat. No. 8,317,602, which is a continuation-in-part of application No. 10/874,558, filed on Jun. 24, 2004, now Pat. No. 7,354,343, and a continuation-in-part of application No. 10/688,898, filed on Oct. 21, 2003, now Pat. No. 7,163,458, said application No. 12/099,778 is a continuation-in-part of application No. 11/158,919, filed on Jun. 22, 2005, now Pat. No. 7,909,694.

(60) Provisional application No. 60/548,481, filed on Feb. 26, 2004.

(51) Int. Cl.
*A63F 13/00* (2014.01)

(52) U.S. Cl.
USPC .................. 463/25; 463/10; 463/13; 463/16; 463/17; 463/18; 463/19; 463/20; 463/21

(58) Field of Classification Search
USPC ............................. 463/13–20, 10, 21, 25–26
See application file for complete search history.

(56) References Cited

U.S. PATENT DOCUMENTS 7,731,195 B2 * 6/2010 Woodbury et al. ............ 273/292

* cited by examiner

*Primary Examiner* — Sunit Pandya
(74) *Attorney, Agent, or Firm* — Muskin & Farmer LLC

(57) ABSTRACT

A wagering game that allows a player to adjust a positive expectation game situation to a lower expectation game situation. In return, the player can increase the paytable so that awards the player wins will be paid at a higher rate. Alternatively, the player can increase the paytable in exchange for a less favorable game state.

16 Claims, 7 Drawing Sheets

WAGERING GAME THAT ALLOWS PLAYER TO ALTER PAYOUTS BASED ON EQUITY POSITION

CROSS REFERENCE TO RELATED APPLICATIONS

This application is a continuation of part of application Ser. No. 10/874,558, now allowed, which both 1) claims benefit to provisional application 60/548,481, and 2) is a continuation in part of application Ser. No. 10/688,898, now U.S. Pat. No. 7,163,458; all three applications (Ser. Nos. 10/874,558; 60/548,481; 10/688,898) are incorporated by reference herein in their entireties. This application is also a continuation in part of application Ser. No. 11/158,919, now pending, which is incorporated by reference herein in its entirety.

This application is also related to U.S. Pat. No. 7,294,054 which is incorporated by reference herein in its entirety. This application is also related to application Ser. No. 10/754,587, which is incorporated by reference herein in its entirety. This application is also related to application Ser. No. 11/379,561, which is incorporated by reference herein in its entirety. This application is also related to application Ser. No. 11/379,555, which is incorporated by reference herein in its entirety. This application is also related to application Ser. No. 11/738,455, which is incorporated by reference herein in its entirety.

FIELD OF THE INVENTION

The present inventive concept relates to a wagering game that allows a player to alter payouts based on an equity position the player has in the wagering game.

DESCRIPTION OF THE RELATED ART

Casino wagering games are a billion dollar industry. When a player is playing a wagering game such as video poker or craps, the player may be limited to a single paytable.

What is needed is a manner in which a player can have an opportunity to receive a different paytable.

SUMMARY OF THE INVENTION

It is an aspect of the present general inventive concept to provide a player an opportunity to exchange game states for a different paytable.

The above aspects can be obtained by a method that includes (a) receiving a wager from a player on a player chosen outcome, the wager paying according to a first paytable; (b) conducting a wagering game with a first game state; (c) progressing the first game state into a second game state based on a random determination; (d) determining from the player that the player wishes to change from the second game state back into the first game state in exchange to activate a second paytable for the wager; (e) reverting the game from the second game state back to the first game state; (f) completing the game to determine whether the wager wins or loses; and (g) if the wager is determined to win, then paying the wager according to a second paytable, (h) wherein if the player did not choose to change from the second game state back to the first game state, then if the wager is determined to win, then the wager is paid using the first paytable.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
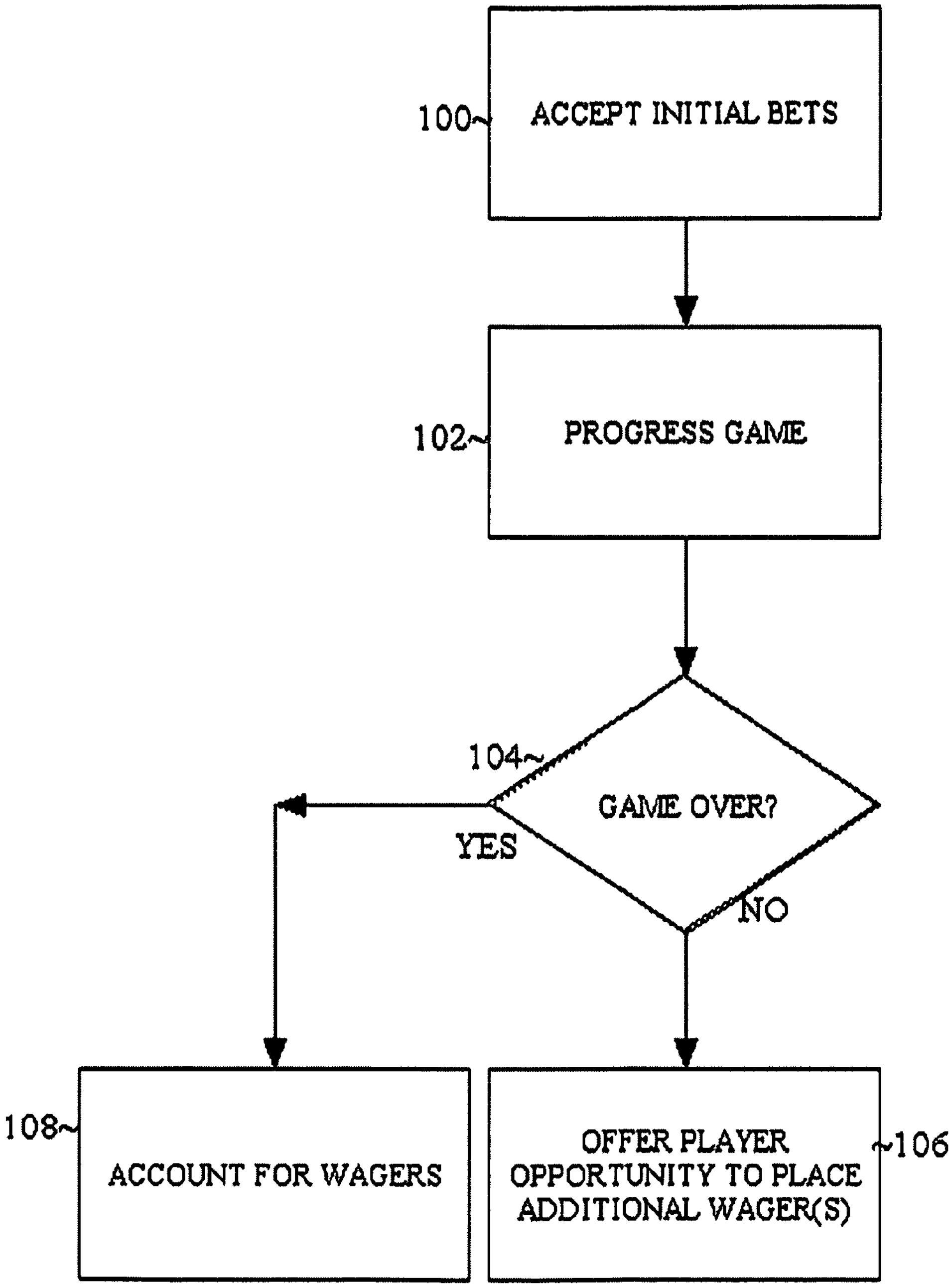
FIG. 1 is a flowchart illustrating one example of a wagering game, according to an embodiment.

Reference will now be made in detail to the presently preferred embodiments of the invention, examples of which are illustrated in the accompanying drawings, wherein like reference numerals refer to like elements throughout.

Reference will now be made in detail to the presently preferred embodiments of the invention, examples of which are illustrated in the accompanying drawings, wherein like reference numerals refer to like elements throughout.

The present invention relates to casino games with a feature allowing a player to borrow money from the house. The loan is not made in accordance with known procedures for borrowing money in a casino, such as applying for credit and receiving a marker or other cash loan to wager with.

The present invention allows a player to borrow money against the player's position in a game already in progress. Some casino games are over immediately (i.e. "casino war,") in which there is really no "in progress" state. Other games, such as games related to betting on progressions, contain a plurality of game states or intervals upon which a player can develop a "positive position." A game related to betting on a progression can comprise a game which has numerous game states, typically with a preferred outcome. A positive position can comprise a game in a particular game state, with or without particular current wagers made, wherein the player has a better than 100% expected return.

In a first embodiment of the present invention, the player can borrow money from the house when the player is in a positive expectation position.

For example, consider a simple game wherein piece A and piece B start at a beginning square are advanced around a 20 square field according to respective rolls of dice, wherein a winner is the piece which reaches a finish area first. If the first three rolls for piece A are 1, 2, 1, then piece A would be at square number 4. If the first three rolls for piece B are 5, 6, 3, then piece B would be at square number 14. Obviously, piece B has a much better chance of winning the game than piece A. If a wager was made on piece B before the race began (assuming each piece pays even money to win), then piece B is considered to have a positive expectation.

A "loan" to the player can be made based on this positive expectation. If the player loses, he typically will not be required to pay the loan back. If the player wins, then the player pays back the loan. However, in exchange for the privilege of taking such a loan out, the player may then also have to pay some type of "interest," commission, vigorish, etc., to the house for the loan.

In an embodiment of the present invention, a player may borrow money from the house if the player is in a positive expectation position and the player makes particular bets wherein the player ensures that he or she is guaranteed to make a profit regardless of an outcome of the game.

For example, consider a bidirectional linear progression game, wherein a piece moves in either of two opposing directions, wherein the game ends when the piece reaches either a leftmost side or a rightmost side. Consider the following exemplary conditions (of course other types of games and conditions can be used besides the one in this example): there are three squares (numbered −1, 0, +1) with finish squares to the very left and right, with one piece moving in either linear direction (left or right) based on a roll of a six sided die (with sides −1, −1, −1, +1, +1, +1, or L, L, L, R, R, R). If the die rolls a −1 (or L), then the piece moves one square to the left. If the die rolls a +1 (or R), then the piece moves one square to the right. When the piece reaches to the finish square left of the leftmost square, or to the finish square to the right of the rightmost square the game is over and either left or right has won. When the piece is on the −1 square, betting on right pays 3:1 and betting on left pays 1:3. When the piece is on the +1 square, betting on right pays 1:3 and betting on left pays 3:1. When the piece is on the 0 square, betting on left or right pays 1:1. Of course the number of squares, parameters of the die, payouts, etc. can be set to whatever the game designer prefers. Further, note that for simplicity this variation has no house edge, although of course a house edge can be worked into the game.

Table I Illustrates an example a game sequence of the above-described game. Each operation can comprise rolling the dice and/or making a wager.

side (although of course the player can choose the amount to wager and the event wagered on). If the leftmost side wins, the player wins $15, while if the rightmost side wins, the player wins −$5 (loses $5). There is no expected profit (or loss) for the player (since this example has no house edge).

The game then proceeds to operation 3, wherein the die is rolled with an outcome of L. Thus, the puck is moved from +1 to 0. Note that the expected profit is now $5, since the puck moved closer to the left which is the outcome that the wager was placed. Thus, the player expectation of this game state is now $5, because in the long run the average amount the player will win is $5. Since this number is positive, the house will lose from this game state in the long run.

The game then proceeds to operation 4, wherein the die is rolled with an outcome of L. The puck moves from 0 to −1. Note that the expected profit is now $10, since the puck has moved closer to the left. This game state is even more favorable to the player and the player's wager than the previous game state.

The game then proceeds to operation 5, wherein the player places a $5 wager on the right. Note that is the puck reaches the leftmost side the player wins $10, and if the puck reaches the rightmost side, the player wins $10. Thus, the player is now in a guaranteed winning situation.

The game then proceeds to operation 6, wherein the player places a $5 wager on the right. Now if the rightmost side wins the player wins $25, while if the leftmost side wins the player wins $5.

The game then proceeds to operation 7, wherein the player places a $5 wager on the right. Now if the rightmost side wins the player wins $40, while if the leftmost side wins the player wins $0 (breaks even from all of the bets).

The game proceeds to operation 8, wherein the die is rolled and the outcome is R. The puck is moved to the right one square to position 0 (the middle). The expected profit is now $20.

The game then proceeds to operation 9, wherein the die is rolled and the outcome is R. The puck is moved to the right one square to position 1. The expected profit is now $30.

The game then proceeds to operation 10, wherein the die is rolled and the outcome is R. The puck is moved one square to the right which places the puck to the right of position 1, which ends the game. The rightmost side has won. The

TABLE I

| Oper. | Action | Result | Position | Bet Placed | Left Win | Right Win | Exp. Profit |
|---|---|---|---|---|---|---|---|
| 0 | Start | n/a | 0 | n/a | $0 | $0 | $0 |
| 1 | Roll | R | +1 | n/a | $0 | $0 | $0 |
| 2 | Wager | n/a | +1 | $5 left | $15 | −$5 | $0 |
| 3 | Roll | L | 0 | n/a | $15 | −$5 | $5 |
| 4 | Roll | L | −1 | n/a | $15 | −$5 | $10 |
| 5 | Wager | n/a | −1 | $5 right | $10 | $10 | $10 |
| 6 | Wager | n/a | −1 | $5 right | $5 | $25 | $10 |
| 7 | Wager | n/a | −1 | $5 right | $0 | $40 | $10 |
| 8 | Roll | R | 0 | n/a | $0 | $40 | $20 |
| 9 | Roll | R | +1 | n/a | $0 | $40 | $30 |
| 10 | Roll | R | Right Win | n/a | | | $40 |

In operation #0, the game starts. The puck is placed on the center position (position 0)). No bets are made yet.

Now the game proceeds to operation 1, which is a roll. The result of the roll is R. Thus the puck is moved 1 square to the right and is now on position +1. No bets have been made, so if right wins or left wins the player wins $0.

The game then proceeds to operation 2, wherein the player makes a wager. The player makes a $5 wager on the leftmost expected profit is now $40, since the player wins a profit of $40 (actually win $60 but has bet $20) and the game is over.

Note that the player has placed $20 in bets (4 bets of $5). However, the player could have started with only $5 in capital, which was wagered in operation 2. Upon reaching operation 5, the house could "lend" the player $5 with which to bet with. This is because the player is putting himself or herself into a guaranteed winning position by making this wager.

Upon place the wager in operation 5, the player is guaranteed a net profit $10 regardless of which side wins. Thus, the house can make this "loan" to the player since the house is guaranteed to get paid back once the game is over. Thus, this wager can be made from the player's own funds or from a "loan" from the house—the end result should still be the same.

The same principle applies to the wagers made in operations 6 and 7. The wager in operation 6 results in both outcomes resulting in a profit, thus the house is guaranteed to recoup the loan once the game is over. In operation 7, the player breaks even if the leftmost side wins. Thus, if the leftmost side wins, the player pushes, as whatever he wins from his or her bets on the leftmost side offset the losses from bets on the other side. The house can "lend" the player the money to make the wager in operation 7 because the player is guaranteed to at least break even, thus paying back whatever loan was made.

Therefore, it is noted that according to an embodiment, the player can begin a game with a finite amount of money, and parlay his or her money into an infinite (in theory) amount of money during the same game. For example, in the above example, if the game did not end in operation 10 but instead the puck traveled back to the left (one or two squares), the player can then make further wagers to increase the amount of his or her win.

In some situations, the player may make a wager which will not put the player into a guaranteed winning situation. However, if the player increases that wager, the player may then put himself into a guaranteed winning situation. For example, in the above example, if the wager in operation 5 is $1 (instead of $5), this would result in a net win of $12 for the leftmost side and a net loss of $2 for the rightmost side. However, if the player wagers $2, then this would result in a net win of $13 for the leftmost side and a net push if the rightmost side wins. Thus, the house may allow the player to make at least a $2 wager in operation 5 (on the rightmost side), since this would result in a no-lose situation for the player (hence the house will always collect the "loan"). But the house may not wish to allow the player to make the $1 wager (unless of course the player is using his or her own money), since there may be a situation where the player will not be guaranteed to pay this loan back.

Thus, the house may wish to compute at what amount a player should make a particular wager in order to be allowed to bet with "borrowed" money. Of course, if the player is not currently in an "equity" state in the game, then no wager (on either side) would put the player into a guaranteed winning situation. An equity state of the game can be considered a position where a player has a positive expectation based on his or her wagers and the game state. A player can "borrow" against this state in order to make further wagers on the game with this borrowed money.

The amount needed to bet in order to put the player into a guaranteed winning position can be computed as follows. First, note that the net win for either or both sides can be computed by the following formulas:

$$\text{Net left win}=(\Sigma\text{left bet on square } n\text{*left payoff for square } n)-\text{total bet};$$

$$\text{Net right win}=(\Sigma\text{right bet on square } n\text{*right payoff for square } n)-\text{total bet};$$

If the player wishes to bet on the leftmost side and needs to be in a guaranteed pushing (or winning) position, then the net leftmost win can be set to zero (or greater) and the "left bet on square n" can be solved for, wherein n is the current location of the puck. For example, consider operation 5 of the example above. Suppose it is to be computed how much the player needs to bet to be guaranteed to break even.

Currently, as per the wager in operation 2, the game has one wager of $5 on the leftmost side made at position R. Thus, using the payouts for this particular example as described above, the net left win is: 0*(4/3)+0*(2)+$5*(4)=$15 (note that 1 is added to the payout to account for the return of the original bet, i.e. a 1:3 payout is represented as 4/3 in the above formula). The player wishes to make a bet on the rightmost side in order to guarantee a breakeven situation. Thus, let X=the amount needed to bet to guarantee a breakeven situation. Thus, we set the net right win to be 0 (a push if right wins), such that:

$$0=0*(4/3)+0*(2)+X*(4)-\text{total amount wagered};$$

The total amount wagered is going to equal the current amount of bets on the game ($5) plus X. So follows the following equation:

$$0=X*4-(5+X);$$

solving for X, we get X=5/3 or $1.67. Thus, the player would need to wager at least $1.67 on the rightmost side in operation 5 in order to break even (or slightly better). This amount can be rounded (up or down) to the closest denomination allowed by the game to be bet.

In an embodiment, an operator may wish to allow the player to wager using borrowed funds only for situations where the player puts himself or herself into a guaranteed winning position. This way the funds are sure to be paid back. In this embodiment, the above formulas/methods can be used to determine when the player will be in a guaranteed winning (or breakeven) position. For example, in one embodiment, money can be loaned to the player as long as both the left net win and the right net win are positive (or at least zero). In this manner, the player cannot lose money on the wager even though the player has borrowed funds in which to do so.

In a further embodiment, the game may automatically compute a wager direction and amount to wager which would guarantee to put the player in a winning (or break even) position, and output this information to the player. For example, in the example above, an optional pop-up window can appear saying, "if you bet $1.67 on the rightmost side, you will be guaranteed not to lose."

Table II below corresponds to the game form Table I and illustrates an example where equity funds are used and the balance between the player's finds (liquid cash present in the machine) and equity funds (funds the player can borrow).

TABLE II

| Operation | player's funds | Equity funds left side | Equity funds right side |
|---|---|---|---|
| 0-2 | $5 | $0 | $0 |
| 3 | $0 | $0 | $15 |
| 4 | $0 | $0 | $15 |
| 5 | $0 | $0 | $10 |
| 6 | $0 | $0 | $5 |
| 7 | $0 | $0 | $0 |
| 8 | $0 | $40 | $0 |
| 9 | $0 | $40 | $0 |

The player starts with only $5 in credits (e.g. the player deposited a $5 bill in the machine) and places a $5 wager in operation 2. In operation 3, because the puck has moved in the direction of the initial wager (left), the player can now bet $15 on the rightmost side. This is because the player will be guaranteed to win (or at least break even) by now betting on the right side. When the player reaches operation 8, the player can now wager $40 on the left side using equity funds, because the house cannot lose by making this loan.

The player may be given the option of whether to use the player's own funds or borrowed funds for making wagers (if the current circumstances dictate that the player will be allowed to borrow money). Alternatively, the player may be forced to use the player's own liquid funds before having to resort to borrowed funds. Alternatively, the player can automatically use borrowed funds wherever possible before having to use the player's own funds.

In a further embodiment, bets placed using equity funds may pay the player less desirable odds (payouts) for the player than bets placed using the players own funds. For example, an additional commission may be taken out of any win based on equity funds. In an embodiment, a player may be allowed to place a bet with borrowed funds if the player is currently in a positive expectation situation.

Alternatively, an embodiment may allow the player to wager on borrowed funds (on any outcome) without meeting break-even (or profit) requirements. In some cases of betting with borrowed money, the long run distribution of funds at the outcome of the game will be the same or similar whether or not the player makes a wager that does not put him or her into a guaranteed winning position. An example of this is in Table I, operation 5, if the player bet $2.50 instead of $5. Thus, in these situations, the house may permit the player to use borrowed funds to wager into a non-guaranteed winning position.

FIG. 1 is a flowchart illustrating one example of a wagering game, according to an embodiment. A progression game is a game which has a plurality of game states, each game state may have a different expected return for the player based on the player's wagers and the current game state. The game is over when the game reaches a terminating game state.

The method can start at operation 100, which accepts initial bets. A player may not be required to wager on the game before the game starts, and may choose to just wager on the game during the game.

The method can then proceed to operation 102, which progresses the game. This can be accomplished by activating a random number generator in order to change the game state. The game state may also be changed by a player choice (i.e. deciding where to move a piece). A die can be used to move a piece (or pieces) in the game.

The method can then proceed to operation 104, which checks to see if the game is over. The game may be over when variable parts of the game state (i.e. piece positions) are in a terminating condition.

If the check in operation 104 determines that the game is not over, then the method can proceed to operation 106, which offers the player an opportunity to make additional wagers. The method can then return to operation 102 which further progresses the game.

If the check in operation 104 determines that the game is over, then the method can proceed to operation 108, which accounts for wagers. This means taking losing wagers and paying winning wagers according to their respective payouts. Any borrowed money can be repaid at this time. The method may then optionally start a new game and return to operation 100.

As discussed previously, an embodiment allows the player to potentially turn a small or finite amount of money into a large or infinite amount of money by betting with borrowed money based on an equity position in the game.

Figure 2:
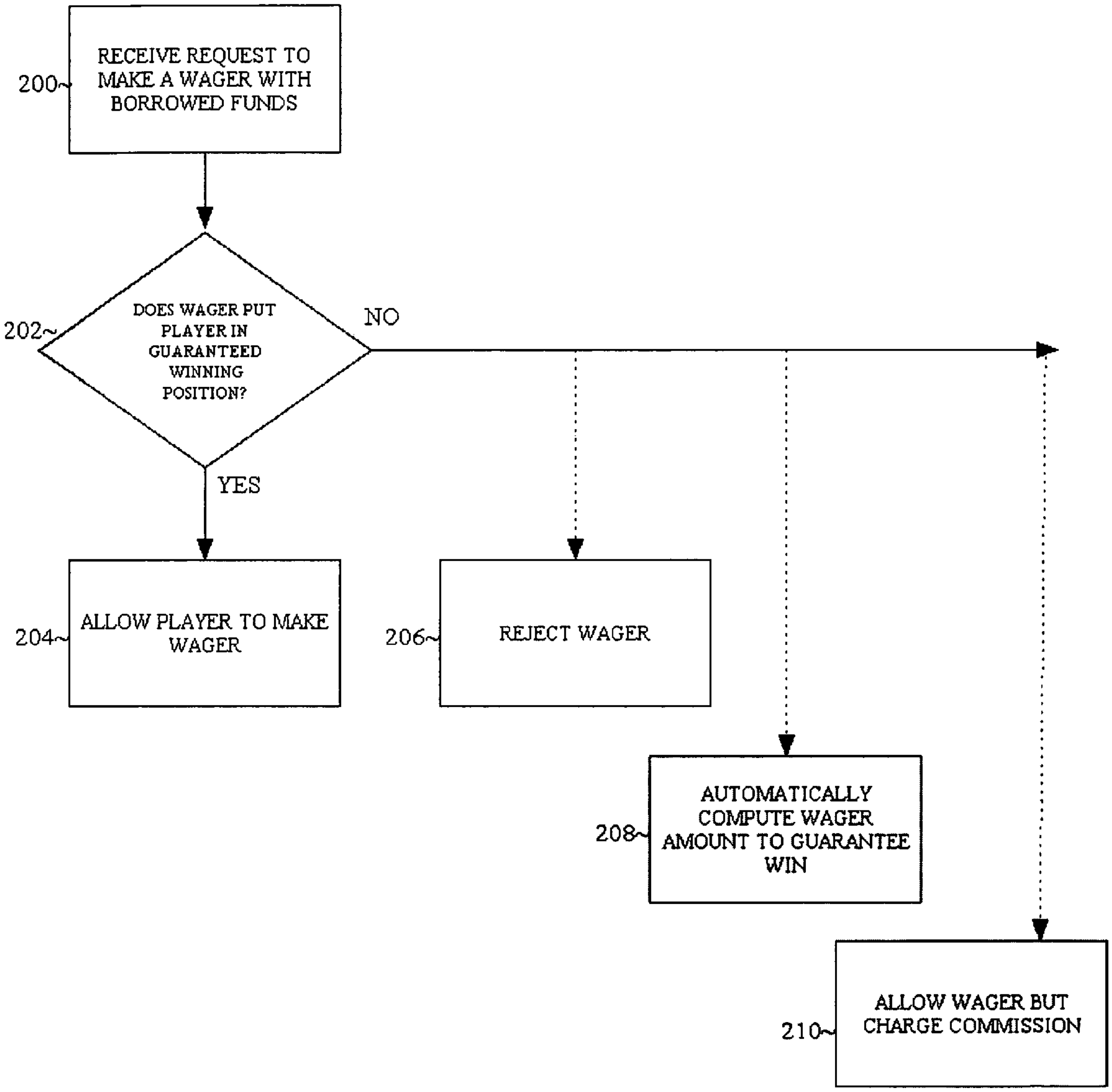
FIG. 2 is a flowchart illustrating one example of borrowing money to pay for a wager, according to an embodiment.

FIG. 2 is a flowchart illustrating one example of borrowing money to pay for a wager, according to an embodiment. The method illustrated in FIG. 2 may occur during operation 106 from FIG. 1.

The method starts with operation 200, which receives a request by a player to make a wager with borrowed finds. The request to use borrowed funds can be explicitly made by the player, or the request can be automatically triggered when a player has no more liquid funds available, or the request can typically be automatically triggered regardless of a player's request of his or her current funds. The borrowed funds can be used from equity (or "equity funds") the player has developed in the current game in progress.

The method then proceeds to operation 202, which determines if the wager will put the player in a guaranteed winning position. This can be done as discussed above, e.g. determining net wins from all possible outcomes and seeing if all net wins result in a positive net win (or at least break even).

If the check in operation 202 determines that the wager puts the player in a guaranteed winning (or at least break even) position, then the method can proceed to operation 204, which allows the player to make the wager. From operation 204, the method can then continue with the game (i.e. proceed to operations 106 or 102).

If the check in operation 202 determines that the wager will not put the player in a guaranteed winning (or break even) position, then the method can proceed to operation 206 which will reject the wager. The player may then try another wager, perhaps a different wager that will not be rejected as such. Otherwise, the game can continue as normal.

Alternatively, if the check in operation 202 determines that the wager will not put the player into a guaranteed winning (or break even) position, then the method can proceed to operation 208, which can automatically compute a wager amount which would put the player in a guaranteed winning (or break even) position. The newly computed wager amount can then be offered to the player for the player's acceptance, or the wager can be made automatically. The computed wager amount can be computed according to the methods described previously. The method can then continue the game.

Alternatively, if the check in operation 202 determines that the wager will not put the player into a guaranteed winning (or break even) position, then the method can proceed to operation 210, which may still allow the wager but charge a commission on the loan. If a player has developed a positive expectation in the current game, then the player may be allowed to borrow against that positive expectation to make a further wager, even if that further wager will not put the player in a guaranteed winning position. It is noted that the house may never receive a payback on this type of loan, for example if the player loses. Typically, the player would not be required to pay such a loan back out of the player's personal funds at a later time. The type of loan for the current game is different from a typical credit loan in which the player must pay back. Thus, in exchange for making the loan to the player in which the house may never get paid back, the house can charge a commission on the loan or can charge an extra commission on any win. In this way, when the game is over, if the result is a net win for the player, the house receives compensation for making the loan. Typically, the average compensation received should offset the potential losses for making this type of loan in the first place.

For example, consider the three square game described earlier. When the puck is on the leftmost square (−1), the player places a $50 wager on the rightmost side. The puck then moves to the rightmost square (+1). The player now has an expected profit of $100. Of course, the player could still lose as well. In an embodiment, the house may choose to loan the player money to make a wager on either side, even though the loan will not put the player in a guaranteed winning position. The "collateral" for the loan is the player's $100 expected profit. The "interest" for such a loan can be a commission taken out of the player's winnings. For example, if the player borrows $10 to now make a bet on the leftmost side, if the puck finishes on the rightmost side the player wins net $140, while if the puck finishes on the leftmost side the player loses $20. A commission can be taken out of the player's winnings (e.g. 20%, or other percentage) to pay for the loan (while if the player loses he does not owe the house money). In this way, the house will still profit from making such loans in the long run. The commission rate should preferably (although not required) be set so that the commission offsets the house's potential loss on the loan such that the house will make more money from making such loans than not making them. In an embodiment, a commission need not be charged.

Thus, according to embodiments, a player can start with a small amount of money, but continue to make wagers while playing the game allowing the player to build up a large amount of wagers and net wins on the game. The amount of wagers placed can exceed the amount of liquid funds the player currently has. Once the game ends, the player is paid and any "loans" are paid off.

In a further embodiment, the equity concept described herein can be applied to craps. Equity obtained in a game of craps can be cashed in. For example, consider if a player bets an initial don't pass line bet of $100. The outcome of the come out roll is 10 ("the point"). According to the standard rules of craps, if the next roll is 10 the player loses while on a 7 the player wins (any other outcome of the dice results in a re-roll). Since a 7 is more likely than a 10, the player has a positive expectation at this point. If the player wishes to surrender this bet, his surrender value is:

(original bet)+(chance of winning*amount to be won)

In this example, the chance of the player winning in this case is (⅓), while the player will win even money on his or her craps bet of $100. Thus, the value of the player's bet is $100+(⅓)*$100=$133.33. Thus, the player can chooses to continue rolling (and win or lose) or accept the surrender value of $133.33, which is based on equity in his position based on events that have occurred in the game (the come out roll). All other situations in craps can be addressed similarly (i.e. other come out rolls, etc.)

The embodiments described herein can also be used to bet on sporting events, either at intervals on individual games or series of games. For example two teams can play a best 4/7 series. After each game in the series (and even during particular games), payout odds for each team winning the series can change to reflect the current conditions (as described herein and/or known in the art) and players can make wagers during the series.

The embodiments described herein can further be applied to a race game, wherein a player wagers on which of a plurality of pieces will reach a finish line first. For example, a player who wagers on a first piece at the start of the race (in this case where each piece starts at the same position with equal advantage) and the first piece takes the lead, then at that interval the player has developed equity in the game, which can be used as a basis to borrow for further bets. In alternative races, the pieces may not have to start at the same location, and pieces may not all have equal advantage (e.g. different pieces may have different speeds or dies).

The embodiments described herein can further be applied to a chase game, wherein a player wagers on which of one or more pieces will reach a dynamic finish line first. The dynamic finish line is a finish point which can change and can for example be another moving piece.

In addition to applying the equity concepts described herein to the above-described games, the methods described herein of using equity funds can also be used for any game that has variable states and is not over without an interval in between states.

In a further embodiment, implementing a wagering game as described herein can be combined with other gambling games such as craps or roulette. For example, a roulette game can also have a section dedicated to wagering on a bidirectional linear progression (as described herein). When the ball stops on black, a puck can move in one direction (e.g. left), while when the ball stops on red, the puck can move in the opposite direction. In this way, this wagering game can operate alongside a standard roulette game, with no additional random number generator needed. Alternative, the bidirectional linear progression can operate alongside a craps game, using predetermined die or dice outcomes to determine which direction the puck moves.

When the player is playing a game in which the player can be "winning" before the game is over, the player may wish to have a way to cash in on the winning state before completing the game. For example, if a player bets on a particular horse in a horse race, and the particular horse is winning, the player has some satisfaction (at least for the moment) that the player is in a good position. Of course, the player's horse can lose and the player can be left with nothing. A player may find it attractive to be able to accumulate (or "bank") a portion of a positive expectation situation for later redemption. In this manner, even if the player ultimately loses his or her wager, the player has not lost everything because the banking has been performed.

For example, consider a $100 craps wager on the Don't Pass line. Since the house edge on the Don't Pass line is 1.364%, the expected value of the player's wager is $98.64. The dice are rolled and the come out roll is a 10. The player is now happy, as the player wins if the shooter rolls a 7 and loses if the shooter rolls a 10 (any other total the shooter keeps rolling). Of course, it is easier for the shooter to roll a 7 than a 10. The probability of the shooter rolling a 7 before a 10 is 66%. Thus, the expected win is $133.33. Of course, the player can still lose the wager if the shooter rolls a 10. The player can surrender his craps bet for $133.33 or a lesser amount (so that the house takes a commission). For example, the house can let the surrender the wager for $125. The house makes money on this proposition, and the player gets the peace of mind of the sure win.

The player can also bank a portion of the expected profit the player has earned for later use. This can be done in a number of ways. The player can receive a $33.33 amount (or an amount based on this such as a lesser amount such as $25 to account for a house commission) and the point can be reset so that the game is in the previous game state with the $100 still wagered on the Don't Come line. Alternatively, the house can take a portion of the player's wager (such as 10%), so that the player now has $90 on the Don't Pass line. The taken portion can be stored for later redemption by the player. The $10 taken actually has an expected value of $13.33. This $13.33 (or a number based on this to account for the house commission) can be accumulated and disbursed to the player at a later time (either later at the instant game, or later at another game, or by electronic redemption). If the shooter rolls a 7, the player then wins $90 and if the shooter rolls a 10 the player loses his wager. However, in both cases, the player has banked the banked value for a later redemption. In this way, the player can continue to wager, but limit his losses by ensuring that some amount is still saved for later.

Consider a bilinear progression type game wherein a player can bet on a puck reaching a left side or a right side; the game has five spots numbered from left to right: −2, −1, 0, +1, +2 for the puck (not including an area to the left of spot −2 when the left side has won and an area to the right of spot +2 when the right side has won); the puck starts on spot 0; a die is rolled to determine whether to move left or right, the die has six sides: −2, −1, −1, +1, +1, +2; from spot −2, left pays 1:5 and right pays 4:1; from spot −1, left pays 1:2 and right pays 9:5; from spot 0 left pays 19:20 and right pays 19:20; from spot +1 left pays 9:5 and right pays 1:2; from spot +2 left pays 4:1 and right pays 1:5. It is noted that these rules are just exemplary and of course any other set of rules/parameters could be used as well.

If the puck is on spot +2 and a $10 wager is placed on the left side, and then the die is rolled results in a −2, the puck is now on spot 0. The player now has an expected profit of $15. This can be computed by multiplying the probability of reaching the left side (50%) by the total win of the left side ($50), and then subtracting the original wager amount ($10). The player may wish to "bank" this expected profit for later use. If the player wishes to bank this amount (or a fraction of this amount), the game state should be adjusted back to remove the amount of player advantage that is banked for later use.

Thus, for example, if the player wishes to bank his or her $15 expected profit, the game state can return to the previous state (e.g. the puck is at +2 with a $10 wager on the left side). This state is less desirable to the player, since the player has no expected profit here. In exchange, the player has banked the $15 in expected profit for later use.

The expected profit banked for later use can be used in a variety of ways. The $15 in the above example can be redeemed by the player for cash. The $15 can also be used to buy positive game states at a later time. For example, if the player is playing a game with multiple game states, and the player wants to put himself in a more favorable state, the player can use the banked money to buy a better state. A value stored for later use can also be applied towards room, food and beverage bills, etc. The value stored for later use can also be redeemed for cash at a later time. The value can also be redeemed for cash instantly, and the redeemed cash can be immediately returned to the player's current credit meter. The value stored for later can be stored locally and/or on a database which can be accessed at a later time.

As a further example, when a player achieves a positive expectation (or profit) in a game, the player can be alerted and/or presented with a pop up window which can make an offer such as, "would you like to revert to the previous game position and receive a free lunch at the buffet worth $15?"

The player can use value stored to purchase better game states than the player currently has. For example, if the player's current game state has a current value of $20, then when the game state is advanced (e.g. rolling of a die, spinning a wheel, generating random numbers on a computer, etc.) the game has a current value of $10 (the new game state was unfavorable to the player compared to the previous game state). The player can use value that the player has banked at a previous time to purchase the better ($20) game state, or any other game state which is improved over the current game state. So for example, if the player has banked a $15 value for later use, and the player has just lost $10 in his or her current game state, the player can apply $10 of stored value to put the game state back to the previous state before it lost $10 in value. The player would then have $5 value remaining which can be used later on for further such transactions.

Figure 3:
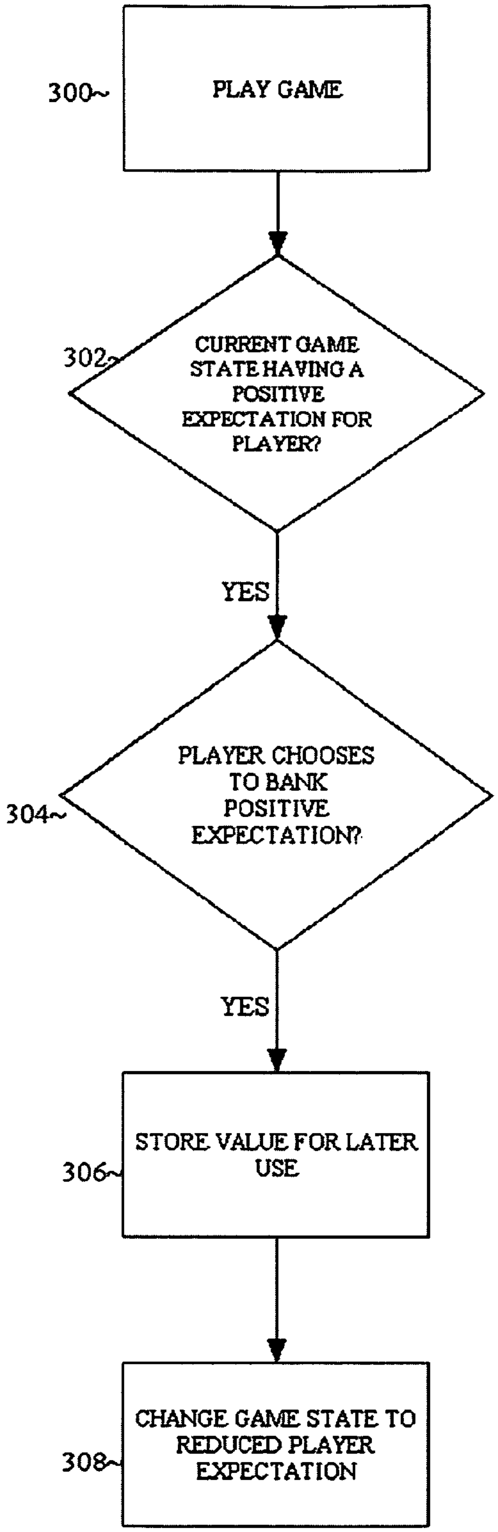
FIG. 3 is a flowchart illustrating an exemplary method of storing positive expectations for later use, according to an embodiment.

FIG. 3 is a flowchart illustrating an exemplary method of storing positive expectations for later use, according to an embodiment.

The method can start with operation 300, which plays a wagering game. The wagering game should be one which has multiple game states, either discrete (each successive game state is prompted and advanced by the player) or continuous (the game automatically advances throughout game states until a player takes an affirmative action to freeze the current game state and take action).

The wagering game can be any wagering game with multiple game states, including but not limited to any of the games described herein or in prior documents incorporated by reference.

The method can continue to operation 302, which determines whether the current game state has a positive expectation for the player. If the current game state has a positive expectation for the player, then the player has "equity" in the game.

The player's expectation in a game can be determined in numerous ways, such as:

For all outcomes, Σ(probability of outcome*reward for the outcome).

The previous amount can also be subtracted by the current amount wagered to determine an expected profit in the current game situation. Either the expectation or expected profit can be used in the computations described herein.

If the current game state has a positive expectation (or positive expected profit) for the player, then the method can proceed to operation 304, which then determines whether the player chooses to bank his or her positive expectation. This can be prompted by an automatic pop up window which allows the player to choose whether he wishes to bank some or all of his recent gains in expectation for later redemption (with a return of the game state to the prior or other position with lesser expected value than the current state). The player can also exercise this option either verbally to a live dealer or electronically with a press of a button which allows the player to bank his or her positive expectation.

If the player chooses in operation 304 to bank his or her positive expectation, then the method can proceed to operation 306, which stores the value the player has banked for later use. This can be stored in the current machine and/or a remote database for later retrieval. A player can bank his or her positive expectation for later retrieval when the player is playing a same or different game at a later point in time.

Either the player can select how much positive expectation to bank, or the machine can automatically calculate an amount of positive expectation to bank. For example, one way to calculate the amount of positive expectation to bank is the amount of positive expectation the player has gained from the previous game state.

From operation 306, the method can proceed to operation 108 which changes the game state to a game state with a reduced positive expectation for the player. The difference in expectation between the changed state and the prior state can be based on the value stored in operation 104. For example, the game state can revert to the prior game state before the last state change, and the value stored can be based on the difference in expected value between the two states.

The value stored can also be adjusted for a house commission. For example, if the player is at game state A (with an expected profit of $15), and the game progresses to game state B (with an expected profit of $25), then the player may wish to bank $10 for later use. The game state can then return to game state A, with $10 added to the player's stored banked value. The $10 can be multiplied by a house commission, for example 0.90. Thus, $9 can be stored for later use by the player.

Thus, by implementing the method as exemplified in FIG. 3, a player can play a multiple state game and bank value for later use. The player may end up losing instant money on a final result of the multiple state game, but nevertheless may have accumulated value which he or she banked for later use in which the overall play for the player may be considered profitable (for example exceed the player's total investment in that game).

In exchange for storing a value redeemable for later use, the value can also be an award of a non-monetary award. For example, a player may receive a free meal, room, or any type of room, food, or beverage credit. For example, after a game state is changed to a more favorable position, and the different between the two positions is worth a value comparable to a free meal at the buffet, a pop up screen may appear, "Player—press this button if you would like to revert to your previous game state and receive a free meal at the buffet." If the player takes advantage of the offer, then the award (such as a free meal) can be mailed to the player or the player can redeem the award in person (e.g. at the buffet counter, a casino host, etc.) The marketing computer can store the fact that the player has won the award.

In a further embodiment, a cumulative value of saved awards can be redeemed at a later time for a higher amount than originally earned. For example, if a player earns $10 during a game to be stored later, the $10 can be redeemed at a later point in time (e.g. the next day, a month later, a year later, or any amount of time) for $11 (or any multiple). In this way, a player may be encouraged to return to the casino at a later time since there will be more money waiting for the player than he or she originally accumulated. Alternatively, saved awards can be redeemed for lower amounts as well. This may be so that the house can take a commission from these transactions. It is up to the casino's preferences to determined whether saved awards can be redeemed at a higher, lower, or same cash value as when they were banked.

Saved awards may also be used to purchase additional game positions. In a bilinear progression type game mentioned above, if the player made a $5 bet on the right side at the −2 position and the puck is currently on the +2 position, the expected profit of the game is approximately $15 with a net win of $20 on the right side. The player may "buy" a roll of +1, thereby resolving or concluding the progression and winning the game, for $5, effectively winning the player $15 after considering the $5 buy-in. This can also be considered similar or equivalent to "surrendering" (or "retreating") the wager in this circumstance, but buying puck moves does not necessarily have to make the player a winner. Puck positions can also be "surrendered" (or "retreated", "sacrificed", or "relinquished") to less valuable positions for the player, in which the player can bank the value of such unfavorable changes in game state.

In yet a further embodiment, when a player achieves a positive change in his or her expectation, a portion of the increased expectation can be automatically banked for later redemption.

For example, consider the bilinear progression game described above. Since the current state (the puck on 0) has an increase in expected profit of $15 from the previous state (when the puck is on 2), the machine can automatically bank a portion (e.g.) 10% of a wager with a positive expected value for later use. Thus, the machine can deduct 10% of the $10 wager ($1) to leave a $9 wager on the left side. The $9 wager on the left side results in a net left win of $36. The expected profit is now 90% of $15 or $13.50. Thus, $2.50 can be banked for later use since this is the expected value of the $1 wager that was removed. The $2.50 is computed by (50% chance of winning on the left side)*$5 (win resulting from the $1 including the original $1 wager). Thus, by automatically removing $1 from the wager that has a positive expectation, the player can bank $2.50 for later use (in any manner described herein).

Figure 4:
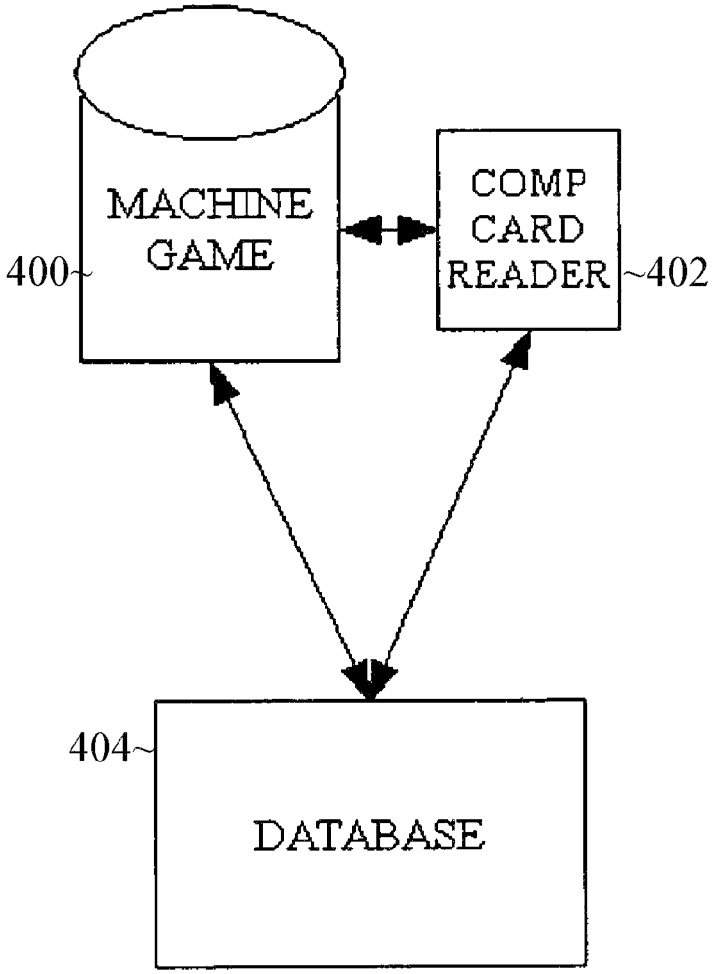
FIG. 4 is block diagram illustrating an exemplary set of components in order to implement an embodiment.

FIG. 4 is block diagram illustrating an exemplary set of components in order to implement an embodiment.

A machine game 400 can be any wagering machine game, such as a slot machine, video poker machine, or machine game which plays any game which can have multiple states (e.g. games which a player can wager on a progression). The machine game 400 can be associated with a comp card reader 402 in which the player can use his or her comp card to identify the player.

A database 404 can be used to store values banked for later use. The database 404 can be accessible by all games in an individual casino or a group of casinos. Value banked for later use can be stored in the database using the player record.

It is further noted that the methods described herein can be applied to all games, including live table games or live sporting events, described herein (which includes the games described in the Ser. Nos. 10/754,587, 10/410,448 and 10/688,898 documents). For example, in any progression type game with multiple states, a player may borrow (or be provided with a bonus with playable credits) money from the house to place guaranteed winning wagers. In some games it may be necessary to make multiple wagers in order to guarantee a win. For example, in a progression game with 3 pieces (A, B, C) in a race or chase to win, if a player has wagered on piece A and is in a positive expectation situation (the player has equity), the player may need to wager on both pieces B and C in order to guarantee a winning position. The house can loan the player the money to place these wagers in order that the player is guaranteed to win.

In a further embodiment, a conditional wager can be placed. A conditional wager is a wager that is placed if a particular pre-condition event happens, and then a conditional wager amount is placed on a conditional wager event. For example, a bettor may wish to place a conditional wager on a Yankees/Braves game. The player wishes to bet $10 that the Yankees will win on the pre-condition that the Yankees are ahead at the end of the fifth inning. The $10 is a conditional wager amount and a Yankee win is the conditional wager event. If the Yankees are not ahead at the end of the fifth inning, then the conditional wager is not placed.

Figure 5:
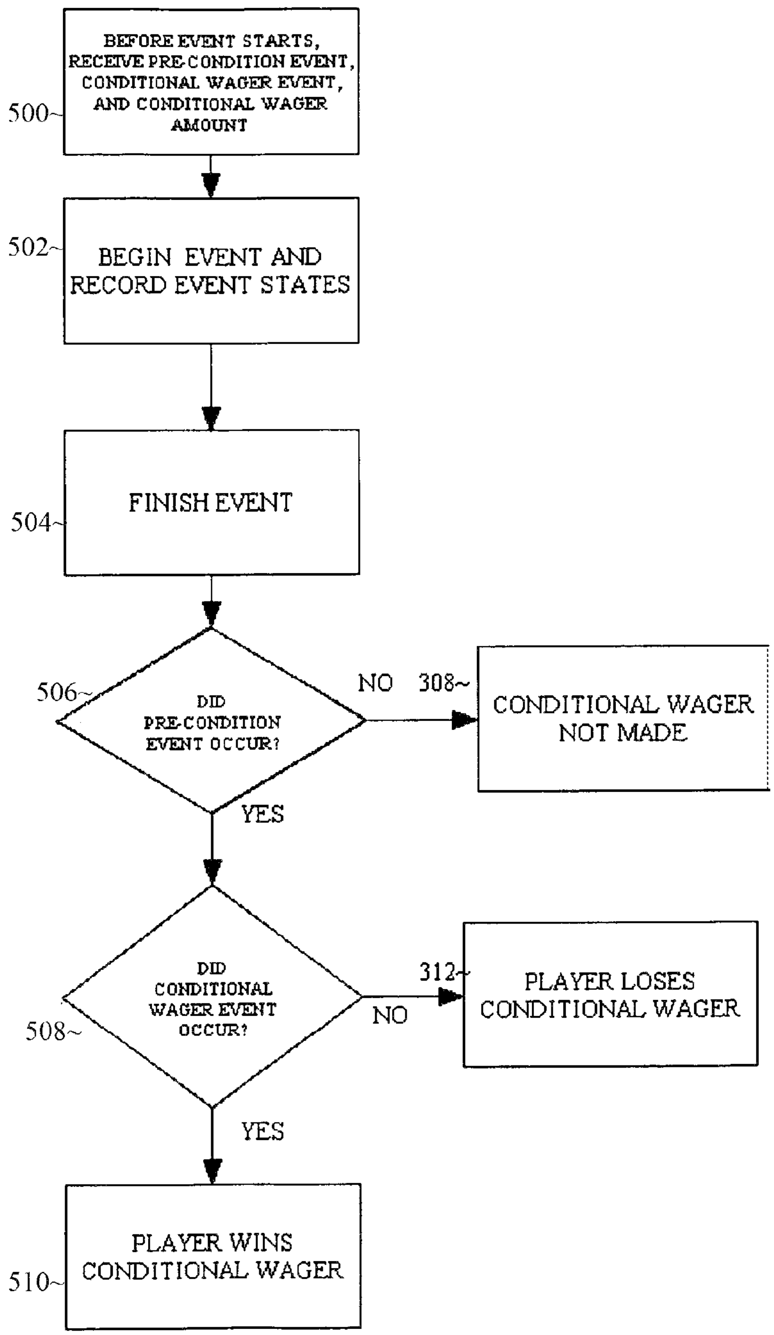
FIG. 5 is a flowchart illustrating an exemplary method of making a conditional wager, according to an embodiment.

FIG. 5 is a flowchart illustrating an exemplary method of making a conditional wager, according to an embodiment.

The method can start with operation 500, wherein before the event starts, a pre-condition event is received, as well as a conditional wager event and a conditional wager amount. The pre-condition event may also include a time period for the pre-condition, which may be either an actual time (e.g. 1 pm, 4 minutes left in the game, etc.) or a discrete segment of an event (e.g. after the fifth inning, at halftime, etc.) The payout odds for the conditional wager event may be known when the conditional wager is placed (typically before the event) or may not be known at the time the conditional wager is placed. The event may be a sporting event (including horse racing, football, etc., simulated by machine or real), a gambling game (e.g. craps, blackjack, etc.), or even a dramatic work (such as a reality show).

From operation 500, the method can proceed to operation 502, which begins the event and records the event states. The event states can be recorded on a digital media, on video capture, etc.

From operation 502, the event can proceed to operation 504, which finishes the event.

From operation 504, the method can proceed to operation 506, which determines whether the pre-condition occurred. If the pre-condition did not occur, then the method can proceed to operation 308, wherein the conditional wager is not made. The amount for the conditional wager may be returned in its entirety, or the house may get a commission on the wager even though it was technically not "in action."

If the determining in operation 506 determines that the pre-condition occurred, then the method can proceed to operation 510 which determines whether the conditional wager event occurred. The conditional wager event is the actual event that the player hopes to occur in order to win the conditional wager. This can be whether a particular team or horse wins an event, a proposition wager within that event, or any outcome that the player has wagered on.

If the determining in operation 510 determines that the conditional wager event did not occur, then the method proceeds to operation 512 wherein the player loses the conditional wager.

If the determining in operation 510 determined that the conditional wager event has occurred, then the method proceeds to operation 514 wherein the player wins the conditional wager. The payouts (odds) for the conditional wager may be determined before the event, or they may be determined after the event using for example pari-mutuel determined odds.

It is noted that the operations in FIG. 5 can be performed in any order. For example, operations 506-508 can be performed before operation 504 (when the event ends).

An advantage of participating in conditional wagering is that the bettor may be able to put himself in a no-lose situation if the pre-condition occurs. For example, consider a two horse horserace with the horse A as a 9:1 long shot and horse B paying 9:10. A bettor wagers $100 on horse A to win the race. The bettor also makes a conditional wager, the pre-condition being that horse A be in the lead at the half-way point and the conditional wager event is that horse B wins the overall race (the odds of B winning should typically be determined based on the conditions at the halfway point).

The conditional wager amount can be set by the player or can be automatically determined to be an amount necessary to guarantee the player a win. At the halfway point, odds can be determined for the outcomes. This can be done on a pure mathematical basis (if the event is determined purely by chance), on a pari-mutuel basis, using a handicapper, or any other method. If the payout for B winning is 5:1 (since A is in the lead it is more unlikely for B to win now), then since there are only two horses in this example the probability of B winning (based on the payout assuming no house, commission for simplicity) is approximately 17% (1/6) and the probability of A winning is 83% (100%-17%). A $100 wager on B would pay $600. Since the player had wagered $100 for A to win and the payout for this bet is $1000 (at 9:1), the expectation of this wager is 0.87*$1000=$870. $10 can now be removed from the original wager amount of $100 on horse A to result in a $90 on horse A, and this frees up $87 (10/100)*870 to place an additional wager. In other words, the current payouts based on the current state can be used to determine a current value of already placed wagers. The additional wager can now be on horse B which is now paying 5:1, which thus pays $600 if horse B now wins, although of course the player would lose his original wager on A. If horse A wins, the player has won $783. The exact amount can be chosen by the player, can be randomly determined, can be calculated to be the minimum amount required to put the player in a break even position, or can be (automatically or manually) chosen to spread the player's equity over both sides.

Thus, using conditional wagering, the player may be able to put himself into a guaranteed winning condition if the player's precondition(s) are met and the payout odds are such that they can support such guaranteed wagers.

In a further embodiment, a player can use equity in a current wager in order to place an additional wager. For example, before the game, a bettor may bet $100 that the Yankees will beat the Braves outright in an even money bet (+100 moneyline). After the fifth inning, the Yankees are winning by 4 runs. At that point in time, the bettor has equity in his wager. The wager has equity in that the bettor may not be guaranteed to win but he or she has a positive expectation in the wager based on the current game state. The probability of the bettor winning his or her wager multiplied by the win amount is greater than the initial wager itself. If a pari-mutuel system (or a handicapper) at that point determines that that the Yankees now have a 66% chance of winning the game, the expected value of the bettor's wager is now effectively $132. The bettor may wish to use equity in his or her wager to place further wagers. The player may wish to use $1 of that amount and make a second wager, for example on a proposition that the game will go into extra innings. A $1 amount is actually worth $1.52 of the first wager ($1/0.66). Therefore, $1.52 can be subtracted from the $100 original wager to result in a $98.48 wager remaining on the Yankees. Now $1 is freed up for a second wager. It is also noted that the player need not be in a positive expectation situation in order to utilize the method of cashing in value for a current wager in progress in order to place a second wager. However, a bettor in a positive expectation situation may be more eager to make further bets when he or she is winning their current wagers.

Figure 6:
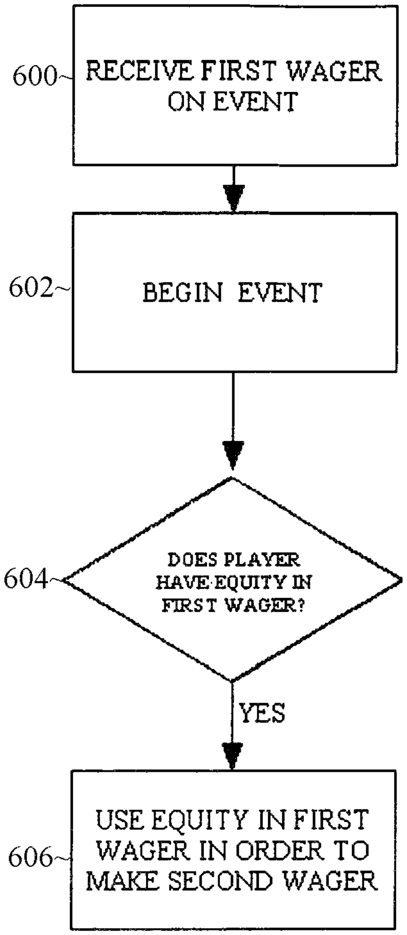
FIG. 6 is a flowchart illustrating an exemplary method of using equity in a first wager in progress in order to fund a second wager, according to an embodiment.

FIG. 6 is an exemplary flowchart illustrating a method of using equity in a first wager in progress in order to fund a second wager, according to an embodiment.

The method can start with operation 600, which receives a first wager on an event. The event can be a sporting event, a gambling game (e.g. card game etc.), or any event that bettors have placed wagers on in the prior art.

From operation 600, the method can proceed to operation 602, which begins the event and progresses a portion of the event (but the event is not over yet).

From operation 602, the method can proceed to operation 604, which determines whether the player has equity in the first wager. The player has equity if the player's expected profit is greater than 0, or if the player's expected winnings is greater than the initial wager.

If the determining in operation 604 determines that the player has equity in the first wager, the method can proceed to operation 606, wherein the player can use some or all of his or her equity in order to make a second wager. The portion of the first wager used for the second wager can be "surrendered" (or "relinquished" or "withdrawn") based on its current value so it can be used for the second wager. The amount of the first wager used for the second wager can be considered a reduction amount. The reduction amount can be for example a percentage of the first wager, a fixed amount, a user-selected amount, etc.

An advantage of doing this while the bettor has equity in the first wager is that the bettor can put himself into a no-lose situation. For example, consider a football game with the Patriots vs. the Giants. The Patriots are a +900 long shot. A bettor wagers $100 on the Patriots. At halftime, the Patriots are winning by +28 points. At this point, a pari-mutuel half-time betting pool determines that the Giants are now a +1000 long shot. Assuming no house commission for simplicity, a +1000 translates into a 10% probability of occurrence of the Giants winning. Thus, the bettor has a 90% chance of winning $900, thus the effective value of the original wager is now 0.90*900=$810. The bettor can now surrender $10 of his original wager which is effectively worth $81. This $81 can now be wagered on the Giants which would result in a $810 win if the Giants win. The player now has $90 wagered on the Patriots for a win of $810 if the Patriots win. Thus, the player is in a no-lose situation and can relax and enjoy the game without worry.

It is further noted that operation 604 is optional, and in fact, even if the player is in a negative expectation situation, the player can still utilize the method described herein of cashing out a portion of a current bet in progress in order to pay for an additional wager.

In yet a further embodiment, a wager can be placed on a horse in a horse race to beat another horse, but irrespective of where the horses involved in the bet actually finish in the race. For example, consider a race with horses A, B, C, D, and E. A player can wager that horse A will beat horse D to the finish line, but it does not matter whether horse A (or D) wins the race or where they finish. The payouts for such a bet can be determined using any known method of determining payouts (e.g. pari-mutuel, etc.) This type of wager can also be applied to other events as well, such as whether player A may score higher than player B in a tournament (e.g. tennis, Texas-Holdem, etc.) irrespective of whether these players actually win the tournament.

It is further noted that any of the games/methods described herein can be applied with a "reverse" feature. For example, when a hunter piece (a piece that is chasing a hunted piece) is moving around a track, the hunter piece can change directions. This can be triggered in a number of different ways, such as by a random number generator, by the hunger piece reaching a certain location, etc. Thus, for example, if hunter pieces X and Y are chasing hunted piece A around a circular track, piece X may suddenly change direction and continue in the opposite direction in the hunt for piece A. In a further embodiment, more than one piece, or all pieces, can change direction (which can include both a hunter piece and a hunted piece).

It is a further feature that any of the games/methods described herein can accommodate an "escape" feature. If a hunter piece is hunting two hunted pieces, the two hunted pieces may manage to escape from the playing field. For example, if the hunted pieces get too far away from the hunter piece, or if one or more hunted pieces reaches a certain location, or by use of a random number generator. If the hunted pieces escape, then the game results in a tie or a further bonus game can be initiated.

In a further embodiment, game states can be exchanged for a different paytable. For example, if a player is playing a multiple state game and the game progresses into a positive expectation situation for the player, the player can exchange the positive game state for higher payouts. Thus, the game state can be changed to a reduced expectation game state (e.g., the player will be expected to make less money than the prior game state), but in return the player can be presented with higher payouts (e.g., a paytable) on live wager(s) already placed.

Figure 7:
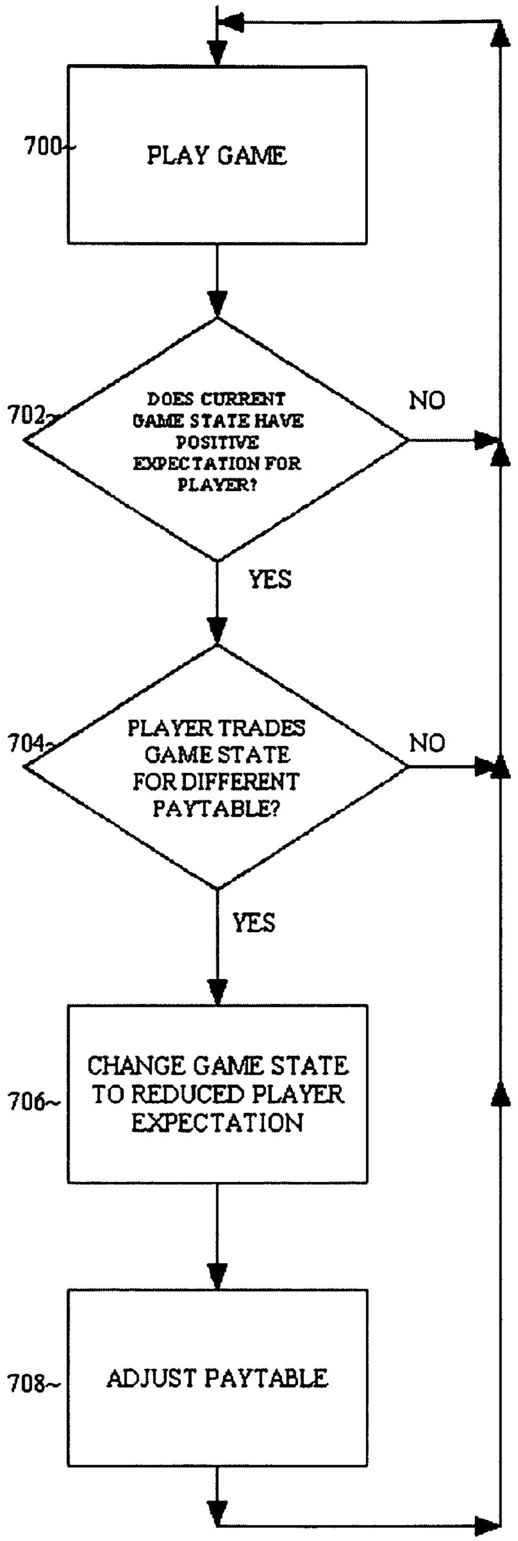
FIG. 7 is a flowchart illustrating an exemplary method of adjusting payouts based on a change in game position, according to an embodiment.

FIG. 7 is a flowchart illustrating an exemplary method of adjusting payouts based on a change in game position, according to an embodiment.

The method can begin with operation 700, wherein the player plays a multi state game. This can be done as known in the art and described herein.

The method can then proceed to operation 702, which determines whether the current game state has a positive expectation for the player.

If the determination in operation 702 determines that the game state has a positive expectation for the player, then the method can proceed to operation 704, which determines whether the player wishes to trade the positive expectation game state for a different (improved) paytable. The player can indicate his or her desire to perform such trade by verbally speaking to a dealing, indicating his or her desire on an electronic input device (e.g., touch screen, keyboard, etc.) If the player does not wish to trade his or her game state, then the method can return to operation 700, which continues to play the game.

If the player in operation 704 decides to trade his or her game state for a different paytable, then the method can proceed to operation 706, which changes the game state to a reduced player expectation game state. This can be done by moving piece(s) on the playing field to a position less favorable to the player. Of course, this is not in the player's advantage to do this without some sort of compensation to the player.

From operation 706, the method can proceed to operation 708, which adjusts the paytable in the game. This is done to compensate the player for the change in game state effectuated in operation 706, which transforms the game playing field into a less desirable situation for the player (not consideration the paytable). Thus, in operation 708, the paytable will be increased (improved) so that the player will win more if the player ultimately wins a payout from the game being played in operation 700.

For example, consider a bidirectional linear progression game, wherein a piece moves in either of two opposing directions, wherein the game ends when the piece reaches either a leftmost side or a rightmost side. Consider the following exemplary conditions (of course other types of games and conditions can be used besides the one in this example): there are three squares (numbered −1, 0, +1) with finish squares to the very left and right, with one piece moving in either linear direction (left or right) based on a roll of a six sided die (with sides −1, −1, −1, +1, +1, +1, or L, L, L, R, R, R). If the die rolls a −1 (or L), then the piece moves one square to the left. If the die rolls a +1 (or R), then the piece moves one square to the right. When the piece reaches to the finish square left of the leftmost square, or to the finish square to the right of the rightmost square the game is over and either left or right has won. When the piece is on the −1 square, betting on right pays 3:1 and betting on left pays 1:3. When the piece is on the +1 square, betting on right pays 1:3 and betting on left pays 3:1. When the piece is on the 0 square, betting on left or right pays 1:1. Of course the number of squares, parameters of the die, payouts, etc. can be set to whatever the game designer prefers. Further, note that for simplicity this variation has no house edge, although of course a house edge can be worked into the game.

Consider the piece starts at the +1) position and the player places a $5 wager for the piece to reach the left side. After the die (or other random number generator) is activated, the piece ends up moving to the left. From Table I, operation 3, the player now has an expected profit of $5. If the piece reaches the left side, the player will win a 3:1 payout (see Table III, pay schedule A).

TABLE III

| Event | Pay schedule A | pay schedule B | pay schedule C |
|---|---|---|---|
| Puck on +1, reaches left | 3:1 | 6:1 | 3:2 |
| Puck on 0, reaches left | 1:1 | 2:1 | 1:2 |
| Puck on −1, reaches left | 1:3 | 2:3 | 1:6 |
| Puck on +1, reaches right | 1:3 | 2:3 | 1:6 |
| Puck on 0, reaches right | 1:1 | 2:1 | 1:2 |
| Puck on −1, reaches right | 3:1 | 6:1 | 3:2 |

Thus, the player now has a game state which is in a positive expectation for the player. The player may wish to continue to play as normal, or the player may wish to trade in the game state for a better paytable. If the player chooses the latter option, the piece can move back to the +1 position (instead of the 0) position. Now it is more unlikely for the piece to reach the left side which would result in the $5 wager winning. The pay schedule can now be changed from pay schedule A to pay schedule B. Thus, the original $5 wager will now win a 6:1 (from Table III, pay schedule B) payout ($30) if the piece reaches the left side and wins.

A player may wish to exchange a positive game state for a better paytable if the player is interested in a more exciting game with the opportunity to win higher payouts. Typically, if the paytable is changed, the revised paytable would only apply to a single wager (or multiple wagers) that are already placed before the paytable is changed. After the paytable is changed, typically, new wagers will still pay on the original paytable. This is because, if new wagers were paid out using the higher paytable, the player may get an unfair advantage on new wagers. Therefore, if the player has reverted the game state and receives pay schedule B (from Table III) on a prior wager placed, then a new wager placed on the game in progress would still pay at pay schedule A (unless another trade/exchange in operation 704) is performed. Thus, different wagers on the table can be paid using different paytables (pay schedules).

In a further embodiment, the player may be allowed to trade a game state that does not have a positive expectation for a better paytable. This can be performed in the manner described herein. An expectation for a game state can be reduced in exchange for a better paytable.

In another embodiment, a paytable can be decreased in exchanged for a better game state. For example, consider the example above, wherein the player bets $5 when the piece is on the +1 position that the piece will reach the left side. The player can opt to move the piece to the 0 position (which makes the $5 bet more likely to win). In exchange, the paytable used can be reduced to compensate for the better player game position. For example, pay schedule C from Table III can now be used. Thus, if the piece reaches the left side (from the 0 position), the player will be paid $7.5 (a 3:2 payout on the original $5 wager). A player may wish to make such an exchange if the player is a gambler that prefers having a reduced risk of losing (even at the exchange of a lower payout).

The revised paytables can be computed by determining the value (other positive or negative) to the player of changing from a first game state to a second game state. That value should then be given back to the player in the form of the adjusted paytable (either exactly or approximately). The house may wish to make it to be an even exchange (the player receives the exact expected value on the wager after the trade that the wager had before the trade), or the house may wish to deduct a commission on the trade (e.g., the modified paytable the player receives on the wager results in a smaller expected to the player than the prior game state without the paytable modification).

The adjustment in paytable can be computed in many ways, for example a simple ratio between the modified paytable and the new expected value can be maintained. For example, consider that a wager has an expected value of A in a first game state and an expected value of B in a second game state. Ratio R of game states is B/A. The payouts in the paytable in use originally can thus be multiplied by R in order to determine the revised payouts/paytable when the game state is changed from the second game state to the first game state. Further, if the house wishes to profit from the transaction at all, the revised paytable can be further multiplied by a constant less than 1 (e.g. 0.99) so that the house receives a slight mathematical benefit from the transaction (which may not be realized in the short run but should be realized in the long run).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of conducting a wagering game, the method comprising:

performing the following operations on a computer via a processor:

receiving a wager from a player on a player chosen outcome, the wager paying according to a first paytable;

conducting a wagering game with a first game state;

progressing the first game state into a second game state based on a random determination;

determining from the player that the player wishes to change from the second game state back into the first game state in exchange to activate a second paytable for the wager;

reverting the game from the second game state back to the first game state without receiving an additional wager from the player;

completing the game to determine whether the wager wins or loses; and if the wager is determined to win, then paying the wager according to a second paytable, wherein if the player did not choose to change from the second game state back to the first game state, then if the wager is determined to win, then the wager is paid using the first paytable.

2. The method as recited in claim 1, wherein the wager in the second game state has a higher expected value than the first game state.

3. The method as recited in claim 1, wherein the wager in the first game state has a higher expected value than the second game state.

4. The method as recited in claim 1, wherein an expected value of the wager in the second game state using the first paytable is equal to the wager in the first game state using the second paytable.

5. The method as recited in claim 1, wherein an expected value of the wager in the first game state using the second paytable is equal to an expected value of the wager in the second game state using the first paytable, but for a house advantage factored into the second paytable.

6. The method as recited in claim 1, wherein the second paytable applies only to the wager but not a new wager placed after the reverting operation.

7. The method as recited in claim 1, wherein the determining comprises offering the player a pop up screen displaying the opportunity to revert to the first game state in exchange for applying the second paytable to the wager.

8. The method as recited in claim 1, wherein the determining comprises displaying the second paytable to the player.

9. An electronic gaming apparatus to conduct a wagering game, the apparatus comprising:

a computer, programmed to perform the following operations:

receive a wager from a player on a player chosen outcome, the wager paying according to a first paytable:

conduct a wagering game with a first game state;

progress the first game state into a second game state based on a random determination;

determine from the player that the player wishes to change from the second game state back into the first game state in exchange to activate a second paytable for the wager;

revert the game from the second game state back to the first game state without receiving an additional wager from the player;

complete the game to determine whether the wager wins or loses; and if the wager is determined to win, then pay the wager according to a second paytable, wherein if the player did not choose to change from the second game state back to the first game state, then if the wager is determined to win, then the wager is paid using the first paytable; and an output device.

10. The apparatus as recited in claim 9, wherein the wager in the second game state has a higher expected value than the first game state.

11. The apparatus as recited in claim 9, wherein the wager in the first game state has a higher expected value than the second game state.

12. The apparatus as recited in claim 9, wherein an expected value of the wager in the second game state using the first paytable is equal to the wager in the first game state using the second paytable.

13. The apparatus as recited in claim 9, wherein an expected value of the wager in the first game state using the second paytable is equal to an expected value of the wager in the second game state using the first paytable, but for a house advantage factored into the second paytable.

14. The apparatus as recited in claim 9, wherein the second paytable applies only to the wager but not a new wager placed after the revert operation.

15. The apparatus as recited in claim 9, wherein the determine comprises, offer the player a pop up screen displaying the opportunity to revert to the first game state in exchange for applying the second paytable to the wager.

16. The apparatus as recited in claim 9, wherein the determine comprises, display the second paytable to the player.

* * * * *